United States Patent [19]

Waki

[11] Patent Number: 4,652,875

[45] Date of Patent: Mar. 24, 1987

[54] PAGER WITH IMPROVED BATTERY SAVING FUNCTION

[75] Inventor: Osamu Waki, Kanagawa, Japan

[73] Assignee: Matsushita Electric Industrial Co., Ltd., Kadoma, Japan

[21] Appl. No.: 700,381

[22] Filed: Feb. 11, 1985

[30] Foreign Application Priority Data

Feb. 14, 1984 [JP] Japan .................................. 59-25471

[51] Int. Cl.$^4$ ........................... H04Q 9/14; H04B 1/16
[52] U.S. Cl. .................................. 340/825.44; 455/343
[58] Field of Search ....................... 340/825.44, 825.47, 340/825.48; 455/228, 343

[56] References Cited

U.S. PATENT DOCUMENTS

| | | | |
|---|---|---|---|
| 4,353,065 | 10/1982 | Mori | 340/825.44 |
| 4,392,135 | 7/1983 | Ohyagi | 340/825.44 |
| 4,398,192 | 8/1983 | Moore et al. | 340/825.44 |
| 4,437,095 | 3/1984 | Akahori et al. | 340/825.44 |
| 4,506,386 | 3/1985 | Ichikawa et al. | 340/825.44 |
| 4,523,332 | 6/1985 | Mori | 455/343 |
| 4,531,237 | 7/1985 | Bar-on et al. | 455/343 |
| 4,554,540 | 11/1985 | Mori et al. | 340/825.44 |

Primary Examiner—Donald J. Yusko
Attorney, Agent, or Firm—Cushman, Darby & Cushman

[57] ABSTRACT

Method and apparatus for use with a pager having a battery-saving function. The pager can receive calls addressed to it even when the pager fails to catch the preamble of the broadcast signal. The broadcast signal is received by a receiver which outputs a series of digital codes corresponding to the received signal. Changes in the level of the digital codes are detected by a change detection device which outputs pulses corresponding to the changes. A synchronization device receives the pulses and provides bit-synchronizing clock pulses therefrom. A counter then counts the number of clock pulses. The counter includes a gate signal generating device for dividing the clock pulses into first and second time-based segments. A comparison device then issues a command signal when the number of clock pulses in the first segment exceeds a first threshold value. The comparison device also compares the number of clock pulses counted in the second segment with a second threshold value when the command signal is issued. The comparison device then provides an output signal when both thresholds, respectively, are exceeded, indicating receipt of a true POCSAG signal. A battery-saving control device initiates the battery-saving function when either one of the first or second thresholds is not exceeded. When both thresholds are exceeded, an individual address code examining circuit examines the received signal for appropriate frame synchronization and individual address codes.

7 Claims, 38 Drawing Figures

PAGER WITH IMPROVED BATTERY SAVING FUNCTION

BACKGROUND OF THE INVENTION

1. Field of the Invention

The present invention relates to pager having battery saving means.

2. Description of the Prior Art

FIG. 2 shows signals of the POCSAG-type (Post Office Code Standardization Advisory Group) which are used in pager systems. The signal comprises a preamble $\alpha$ and plural batches $\gamma 1, \gamma 2 \ldots$ which follow the preamble $\alpha$. Each batch comprises a frame synchronizing signal S1, S2 . . . and several frames (e.g. eight frames of #0 to #7). The preamble $\alpha$ indicates that batches $\gamma 1, \gamma 2 \ldots$ will be sent following its preamble $\alpha$, and the preamble $\alpha$ comprises repetitive signals of 1's and 0's. In the batch, respective frames are sent after respective predetermined time periods from the frame synchronizing signal. Each pager has a code with a group number (e.g. one of #0 to #7) assigned thereto and an individual address code within said group.

FIG. 2(b) shows the operation of the Prior-Art pager. Assume that the pager is assigned with a group number of #2, and assigned an individual address code of #11506. The pager watches for the preamble $\alpha$ in watching operation $\eta$. When the pager does not receive the preamble $\alpha$ in the examining operation $\delta 1$ for the preamble, the pager turns off a battery to save battery power (battery saving operation). After a predetermined time, the pager turns on the battery again to carry out another examining operation $\delta 2$.

In an examining operation $\delta 3$, the pager receives preamble $\alpha$ from the base station. Then the pager maintains the ON-state of the battery, watching for the frame synchronizing signal S (carrying out a watching operation $\epsilon$ for the frame synchronizing signal (see FIG. 2(b)). After receiving the frame synchronizing signal S1, the pager turns off a battery and maintains the OFF-state of the battery until reaching the selected frame #2 which corresponds to its group number #2. When the predetermined time period for the selected frame (#2) comes, the pager turns on the battery. The pager turns on the battery a little before the beginning time of the frame #2 to ensure reception of the entire frame #2.

This pager (group #2, individual address #11506) receives information signals which follow the individual address signal corresponding to its individual address code #11506. In the frame #2 of the 1st batch $\gamma 1$, the pager carries out an examining operation $\zeta 1$ for examining whether the received individual address code corresponds with its individual address code (#11506) or not. In this case, when the received individual address code (#12002 see FIG. 2(a)) does not correspond to the pager's own individual address code (#11506), the pager turns off the battery (see FIG. 2(b)) after the examining operation $\zeta 1$. Therefore, the pager does not receive information signals which follow the individual address signals, because the information signals must be intended for another pager (#12002).

In the frame #2 of the 3rd batch $\gamma 3$ (examining operation $\zeta 3$), the pager finds an individual address signal corresponding to its individual code (#11506). Then the pager maintains the ON-state of the battery, and receives information signals intended for it.

When the frame synchronizing signals are not received, the pager carries out another watching operation in the next preamble which will come later.

FIG. 1 shows a block diagram of the prior art pager. In the examining operation $\zeta 1$, the signal from the base station is received through an antenna and demodulated into digital signals by a receiving circuit 2. The digital signal is rectified by a rectifier circuit 3. This rectified digital signal is synchronized with a reference clock signal from a clock generating circuit 11 by a bit synchronizing circuit 4 (the synchronization establishment operation). This synchronized digital signal (hereinafter the rectified signal) is inputted to an examining circuit 6. The examining circuit 6 examines whether the rectified signal is the preamble signal or not by comparing the rectified signal with preamble data generated in a circuit 5. Since in the examining operation $\zeta 1$ the preamble signal is not detected, a battery saving circuit 12 stops supplying power from the battery 16 to the receiving circuit 2 and the rectifier circuit 3. Then the pager maintains a watching operation $\eta$ for the preamble.

Since in the examining operation $\zeta 3$ the preamble signal is detected, the battery saving circuit 12 does not stop supplying power from the battery 16. Then, the pager observes the frame synchronizing signal S1 with the examining circuit 8, which compares the rectified signal and frame synchronizing data generated by circuit 7. When the frame synchronizing signal is detected, the battery saving circuit 12 stops supplying power until frame #2 arrives. In frame #2, an examining circuit 10 for examining individual address codes compares the rectified signal and the individual address code generated in circuit 9, and detects the individual addressing. When the examining circuit 10 detects the individual addressing, the speaker 15 is energized to make a beep tone by a buffer 14 and a control circuit 13.

The above-mentioned Prior-Art pager has disadvantages as follows.

When the pager fails to detect the preamble $\alpha$ in the examining operation $\zeta 3$, the pager fails to receive the information signal. By failing to detect the preamble due to fading etc., the pager maintains the watching operation n as shown in FIG. 2(c). The preamble $\alpha$ will not be detected in examining operations $\zeta 4, \zeta 5$ and $\zeta 6$. Therefore, the pager cannot carry out the examining operations $\zeta 1, \zeta 2$ and $\zeta 3$, and it fails to receive the information signals. In the prior art apparatus, bit-synchronization must be established prior to the preamble examination. The time required for such a preamble examination necessitates a longer time than the sum of the time required to establish synchronization in the bit synchronizing circuit 4 and the time required for preamble pattern examining by the examining circuit 6. Accordingly, there is a problem of taking too long for preamble examining.

SUMMARY OF THE INVENTION

The purpose of the present invention is to provide an improved pager which can receive calls addressed to the pager even when the pager fails to catch the preamble.

The pager in accordance with the present invention comprises a change detector for detecting changes of signal from the base station, a counter for counting the output signal of the change detector depending on the state of a gating signal generated in the pager in bit-synchronism with the signal from the base station, and a battery saving circuit which is controlled based on the count of the output of said counter. The pager according to the present invention also includes receiving the signal from the base station and for issuing digital codes corresponding to the received signal. The pager according to the present invention also includes change detection means for detecting changes in the digital signal level of the digital codes to issue pulses responding to the detected changes. The pager according to the present invention also includes synchronization means for producing bit-synchronizing clock pulses from the output of the change detection means. The pager according to the present invention also includes counter means for counting the number of clock pulses. The pager according to the present invention also includes comparison means for comparing the output of the counter means with a predetermined value to determine whether the present state is a no-signal state or a state of reception of a POCSAG signal, thereby issuing an output when said state is the state of receiving the individual address code. The pager according to the present invention also includes battery-saving control means for saving battery power upon the reception of an output from the comparison means. The pager according to the present invention also includes individual address code examining means for examining frame synchronization and individual address codes at the reception of the individual address code.

DETAILED DESCRIPTION OF THE PREFERRED EMBODIMENT

Figure 1:
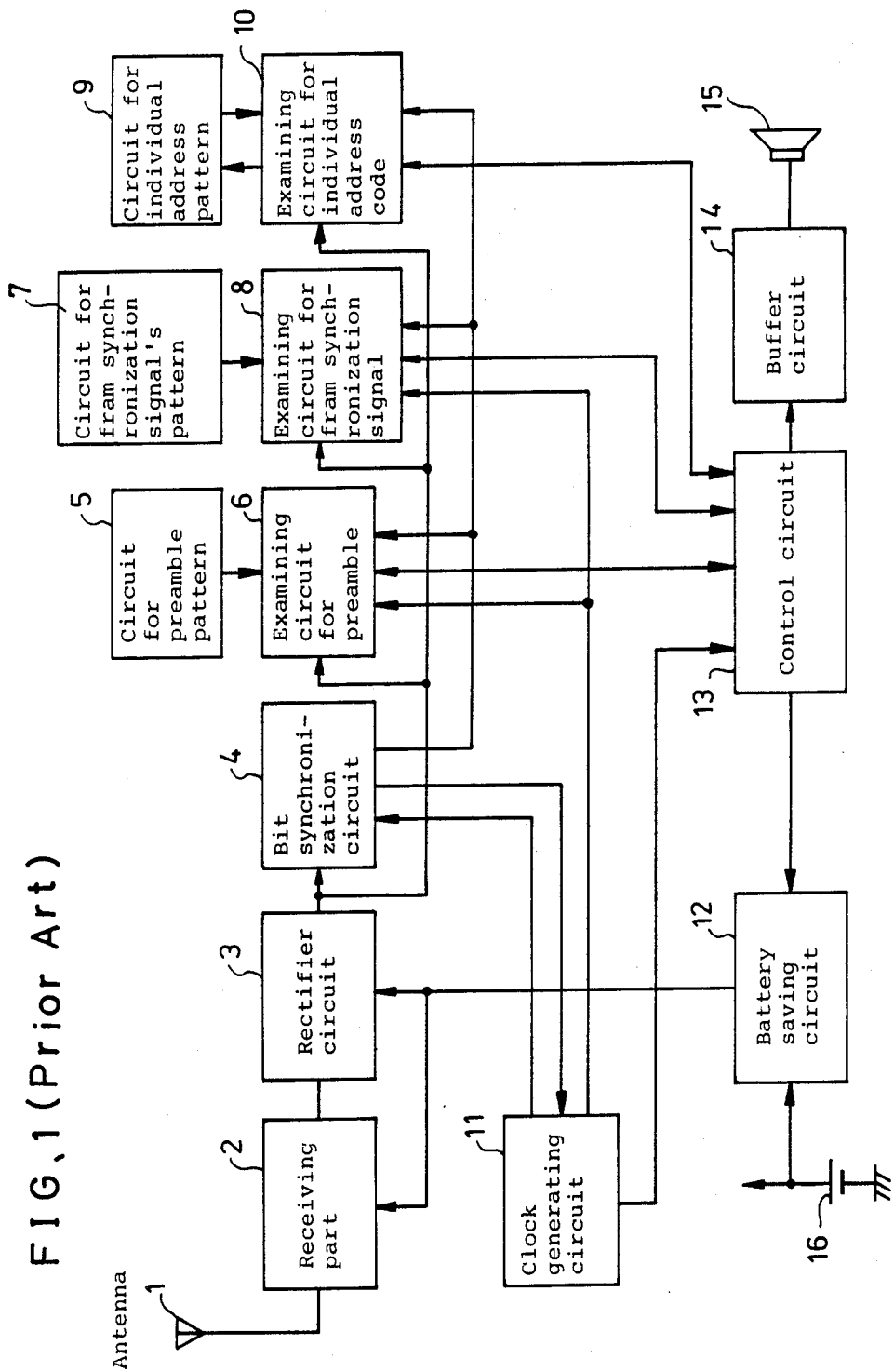
FIG. 1 is the block diagram of a Prior-Art pager.
Figure 2:
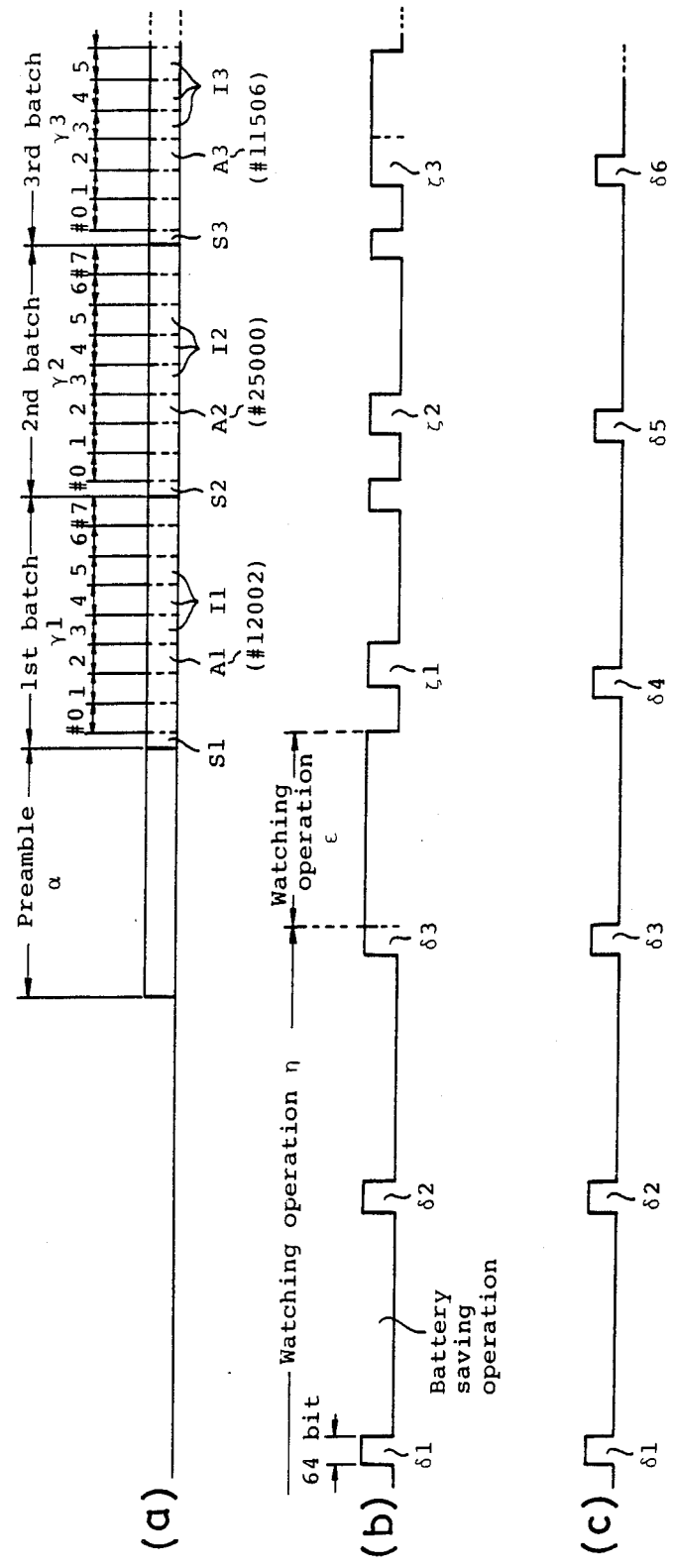
FIGS. 2a–c are the graphically illustrated timing diagrams of the Prior-Art pager shown in FIG. 1.
Figure 3:
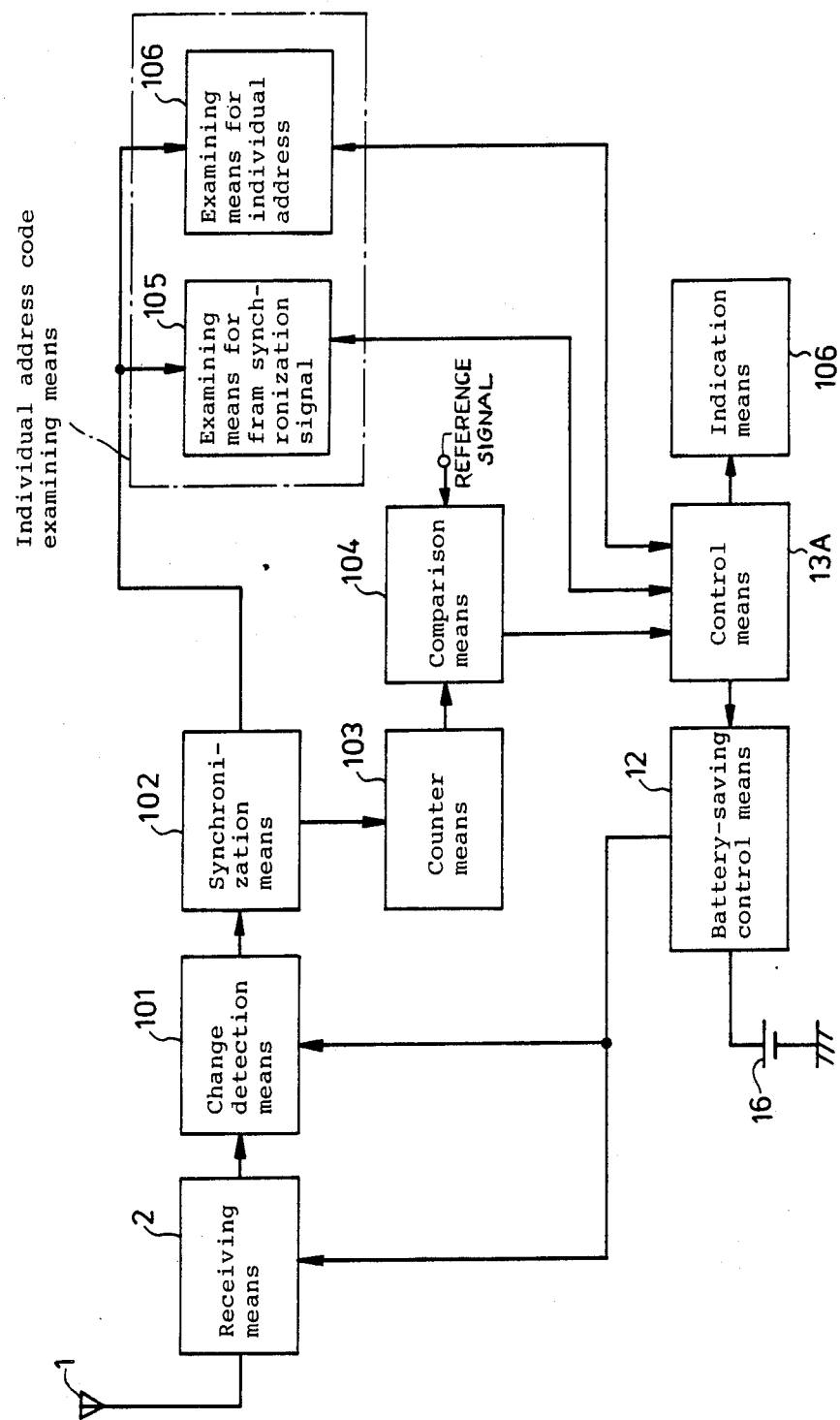
FIG. 3 is a block diagram of a preferred embodiment of the pager of the present invention.
Figure 4:
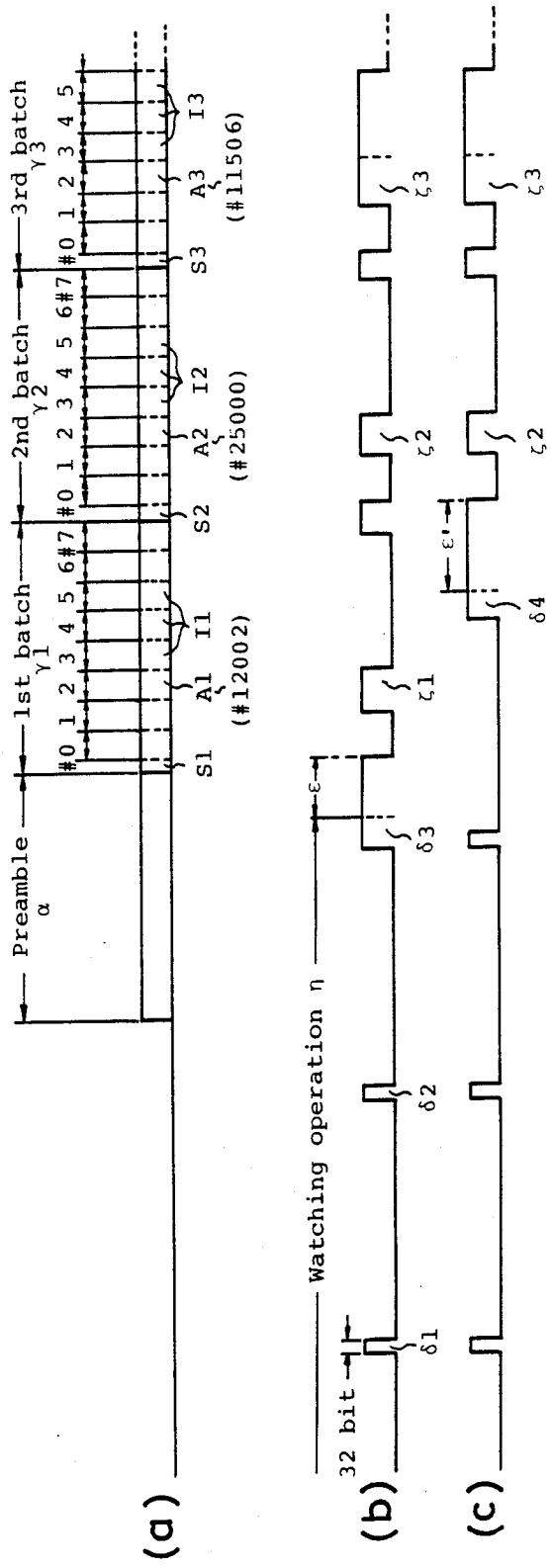
FIGS. 4a–c are graphically illustrated timing diagrams of the pager illustrated in FIG. 3.

FIG. 3 is a diagrammatic illustration of the exemplary embodiment pager of the present invention. FIG. 4 is a graphically illustrated timing diagram of the pager shown in FIG. 3. Assume that the pager is assigned the group number of #2, and assigned the individual address code of #11506.

In the watching operation $\eta$, the pager carries out a counting operation for detecting some signal (for example preamble signal, information signal, etc.). In the counting operation 61 of the watching operation $\eta$, a signal from the base station is received by the antenna 1 and demodulated into a digital signal by the receiving means 2. A change detection means 101 detects changes in the digital signal level (for example, voltage level) and issues a pulse indicating the change in the digital signal level. This change pulse is synchronized with a reference clock signal by a synchronization means 102 and counted (by use of the reference clock) by a counter means 103. A comparison means 104 compares the counted number from the counter means 103 and a predetermined reference number stored in ROM, etc. Then, when the counting number is larger than the reference number (it takes place when the pager receives some signal), the output of the comparison means 104 changes. Control means 13A receives this change from comparison means 104 and activates the pager watching operation $\epsilon$ to watch for the frame synchronizing signal S1 with an examining means 105 (See FIG. 4(b), watching operation $\epsilon$).

Then, the pager carries out the examining operation $\zeta 1$, $\zeta 2$ and $\zeta 3$ for the individual address code #11506 with an examining means 106. After the examining operation $\zeta 3$, the pager receives an information or message code I3, and produces a beep tone.

In the case where the pager fails to detect the preamble $\alpha$ in the counting operation $\delta 3$, the pager cannot carry out the examining operation $\zeta 1$ (See FIG. 4(c). But, the pager carries out the watching operation $\epsilon'$ and the examining operations $\zeta 2$ and $\zeta 3$, because it receives some signal in the counting operation $\zeta 4$. Therefore, the pager can still receive the information signal I3.

Figure 5:
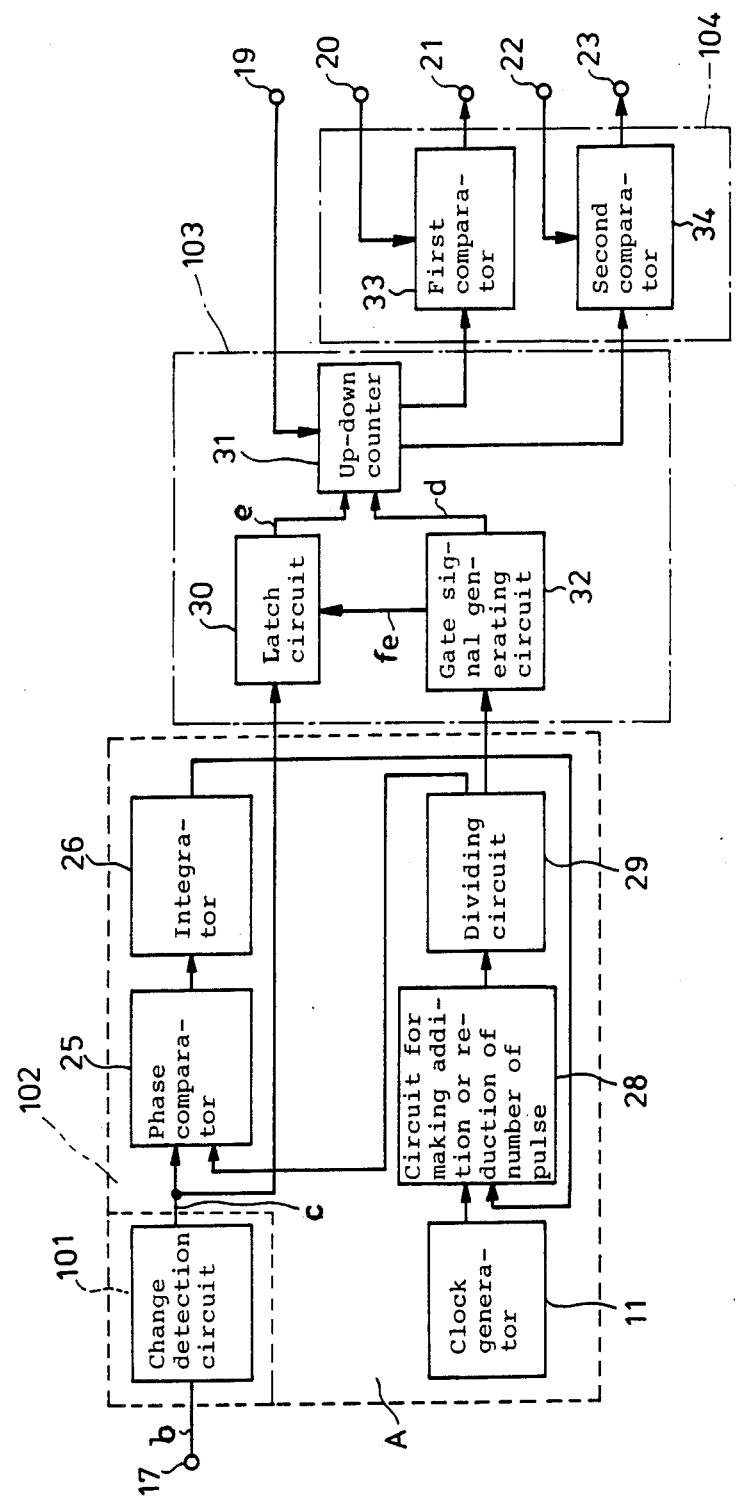
FIG. 5 is a partial block diagram of the pager illustrated in FIG. 3.
Figure 6:
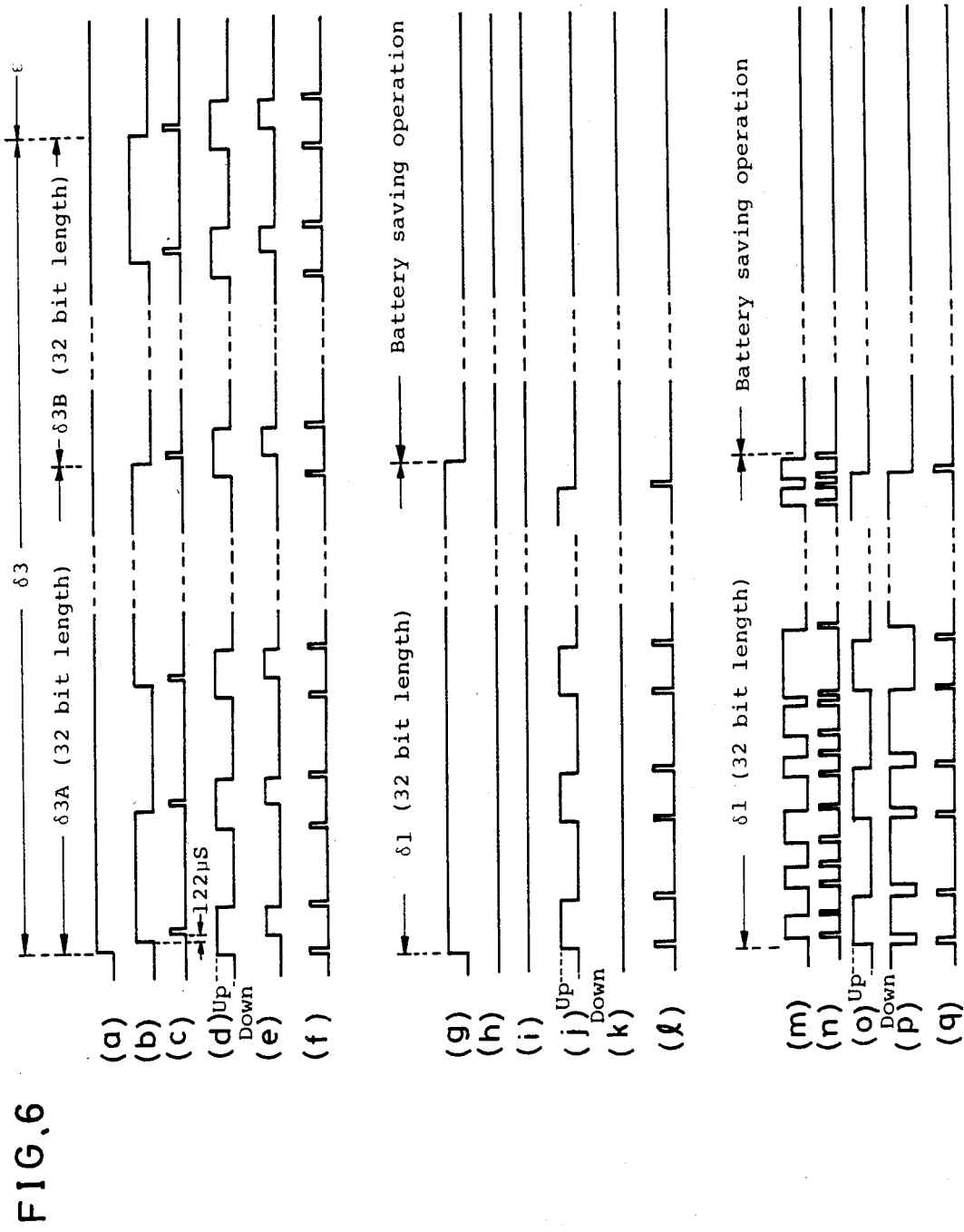
FIGS. 6a–q and 7a–f are graphically illustrated timing diagrams of the pager shown in FIGS. 3 and 5.

FIG. 5 is a detailed block diagram of change detection means 101, synchronization means 102, counter means 103 and comparison means 104. Reference numerals 19, 20, and 22 denote input terminals for reference signals from control circuit 13A. In the counting operation $\zeta 3$ (see FIG. 4(b)), the circuit shown in FIG. 5 is operated as shown in (a) to (f) of FIG. 6. The digital signal of preamble a from the receiving means 2 is impressed on the terminal 17 as shown in FIG. 6(b) (NRZ code, 512 Bit per second, POCSAG (1 word=62.5 mS, 1 batch=1.0625 S, unit bit time length=1.95 ms). The change point of this digital signal of preamble $\alpha$ causes the generation of a changing point pulse which is issued by a change detection circuit 101 as shown in FIG. 6(c). The changing point pulse is inputted to a latch circuit 30, and sets the latch circuit 30. The output of the latch circuit 30 is provided to a counting input terminal of a counter circuit 31. The latch circuit 30 is reset by a reset pulse (see FIG. 6(f)) from a gate signal generating circuit 32. Therefore, the latch circuit 30 outputs a pulse as shown in FIG. 6(e). Then, the counter 31 counts the number of pulses provided from latch circuit 30 within a predetermined (e.g. 32 bit) time period.

The gate signal generating circuit 32 outputs a gate signal (See FIG. 6(d)) to a command input terminal of the counter 31. A high state of this gate signal activates up-counting in the counter circuit 31, and a low state of this gate signal activates down-counting in the counter circuit 31 (See FIG. 6(d)). This gate signal is synchronized with the changing point pulse as shown in FIGS. 6(c) and (d) by a known digital PLL part A. When the digital signal of the preamble is impressed on the terminal 17 as shown in FIG. 6(b), the counter circuit 31 counts the number (16 in this embodiment). At a predetermined end time of the first counting operation $\delta 3A$ (32 bit time length), the counter 31 outputs the counting number (16 in this case) to a first comparator 33. Then the first comparator 33 outputs a command signal when the counting number is larger than a first predetermined number (3 in this embodiment) to the control means 13A through a terminal 21. The command signal activates a second counting operation 63B (32 bit time length) as shown in FIG. 6(a). At a predetermined end time of the second counting operation $\zeta 3B$, the counter 31 outputs the counting number of 16 to a second comparator 34. Then the second comparator 34 outputs a command signal, which is issued when the counting number is larger than the second predetermined number (7 in this embodiment), to the control means 13A through a terminal 23. The command signal activates the watching operation ε for frame synchronizing signal.

In the counting operation ζ1 (See FIG. 4(b)), the circuit shown in FIG. 5 is operated according to timing diagrams (g) to (l) of FIG. 6. No digital signal from the receiving means 2 is impressed on the terminal 17 as shown in FIG. 6(h). No changing point pulse is generated as shown in FIG. 6(i). Therefore, the latch circuit 30 outputs no pulse as shown in FIG. 6(k). At the end time of the first counting operation 61, the counter 31 outputs the counting number (0 in this case) to the first comparator 33. Then, the first comparator 33 does not output the command signal. The state of no command signal activates the battery saving operation.

When noise is received in the counting operation 61, the digital signal shown in FIG. 6(n) is impressed on the terminal 17 from the receiving means 2. In this case, the counter 31 alternately carries out the up-counting and down-counting as shown in timing diagrams (o) and (p) of FIG. 6. After the first counting operation ζ1, the pager will activate the battery saving operation, because the counter 31 does not count over the first predetermined number 3. If the counter 31 does count larger than the first predetermined number 3, the pager carries out the second counting operation. But, at the end of the second counting operation the counter 31 can hardly count larger than the second predetermined number 7. Therefore, the pager still carries out the battery saving operation.

Figure 7:
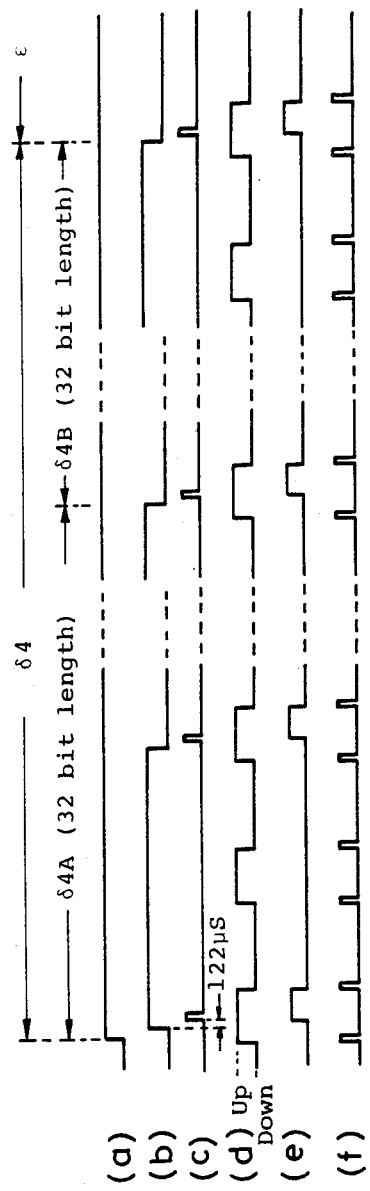

In the counting operation ζ4 (see FIG. 4(c)) which is carried out after failing to detect the preamble α, the circuit shown in FIG. 5 is operated according to timing diagrams (a) to (f) of FIG. 7. The digital signal from the receiving means 2 is impressed on the terminal 17 as shown in FIG. 7(b) because some signal is sent from the base station and continues even after the failure to detect the preamble. At the end time of the first counting operation 64A (32 bit time length), the counting number of the counter 31 becomes equal to the number of the changing point of the digital signal from the receiving means 2 within the first counting operation 64A (32 bit time length). The number of the changing point is in most cases larger than 7. Therefore, thereafter the pager carries out the second counting operation and the watching operation ε' for the frame synchronizing signal.

It is desirable to set a duty factor of the gate signal to 6/16 (High period: Low period=6:10). The narrow width of the gate signal prevents erroneous up counting due to noise, etc. (cf. high state of the gate signal activates up counting), but excessively narrow width of the gate signal causes failure of the counting of the changing point pulse even when a slight shift of phase of the changing point pulse takes place.

Figure 8:
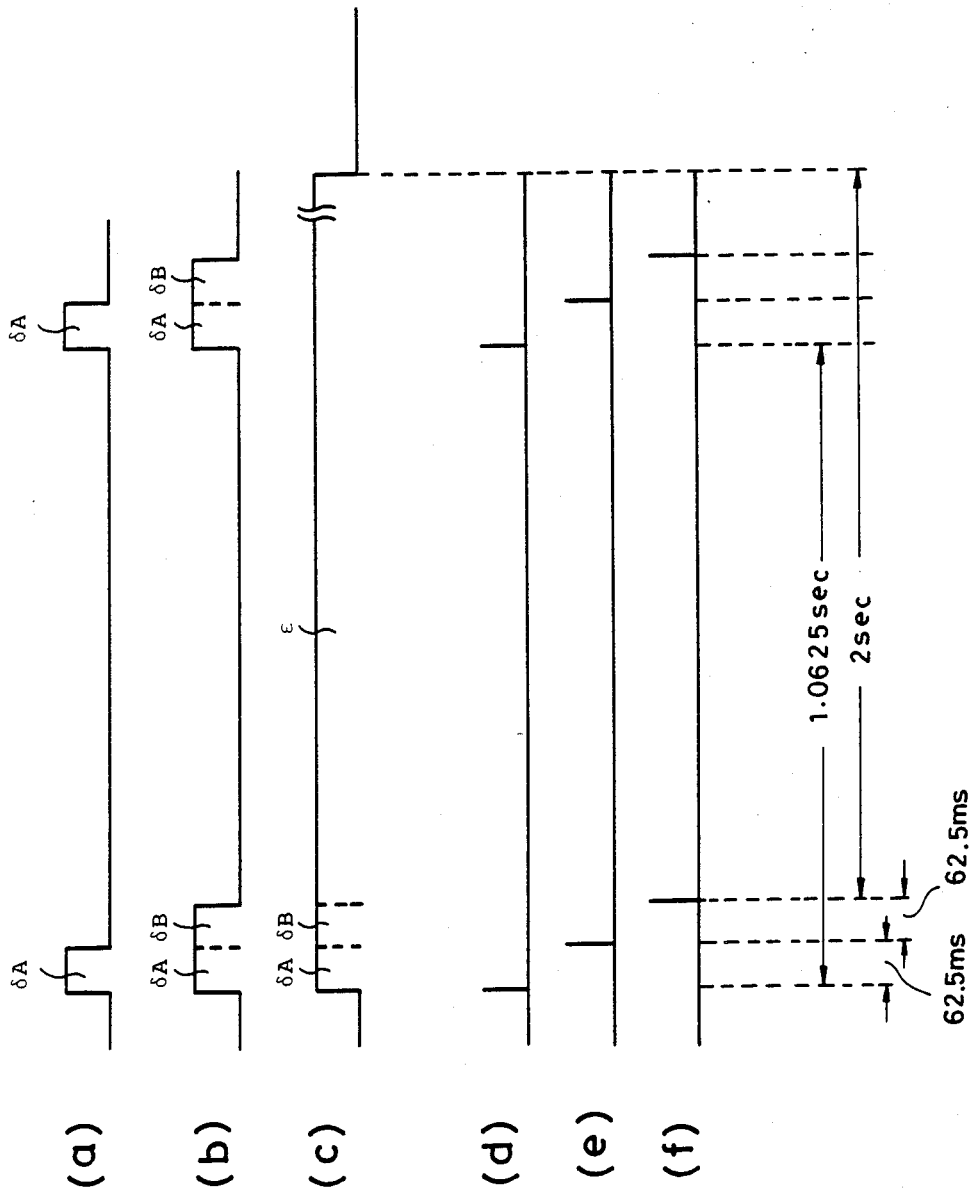
FIGS. 8a–f are graphically illustrated timing diagrams for showing the battery saving operation of the present invention.

FIG. 8 shows a timing chart for indicating the battery saving operation of the pager. FIG. 8(a) shows the first counting operation 6A proceeds in 62.5 mS (i.e. 32 bit time) with a pitch of 1.0625 S (i.e. 1 batch length). FIG. 8(b) shows the first and the second counting operations ζA, ζB (hereinafter mode 2 operation). The first and the second counting operations ζA, ζB are carried out in 125 mS (i.e. 64 bit time) with a pitch of 1.0625 S (i.e. 1 batch length). FIG. 8(c) shows the watching operation ε for the frame synchronizing signal (hereinafter mode 3 operation). The watching operation ε is carried out in sufficiently longer time in this embodiment, (2 sec) than 1 batch length for surely catching the frame synchronizing signal.

In the mode 1 operation, the counter 31 is reset at every timing shown in FIG. 8(d). Then, the counted number of the counter 31 is compared with the first predetermined number (3, in this embodiment) at the timing shown in FIG. 8(e) when the counted number is smaller than 3, the pager maintains the mode 1 operation. When the counting number is larger than 3, the pager carries out the second counting operation ζB (i.e. mode 2 operation). Then the counting number of the counter 31 is compared with the second predetermined number (7, in this embodiment) at timings shown in FIG. 8(f). When the counting number is smaller than 7, the pager returns to the mode 1 operation. When the counting number is larger than 7, the pager carries out the watching operation ε (i.e. mode 3 operation).

In place of the first and the second comparators 33, 34 used in the above-mentioned embodiment, a single comparator may be substituted therefor to obtain substantially the same results.

The above-mentioned concrete numbers, e.g. 3 for the first predetermined number, 7 for the second predetermined number, etc. are indicated only as one example. Of course, these numbers must be changed corresponding to the operating condition of the pager.

This invention is not limited to the system with the concrete numbers described in the embodiment.

In accordance with this invention, even if the pager fails to detect the preamble by fading, etc., the pager can receive the information signal. The pager in accordance with this invention can catch some signal from the base station, and then can carry out the watching operation ε for frame synchronizing signal.

The time required for the counting operation ζ in the present invention is shorter than that of the preamble examining operation in the prior art. Therefore, the present invention can effectively save the battery. In the present invention, the establishment of the synchronization is carried out in parallel with the counting. On the contrary, in the prior art apparatus, bit-synchronization must be established prior to the examining operation for the preamble.

I claim:

1. A pager having a battery power source, comprising:

receiving means adapted for receiving a signal from a base station and issuing digital codes corresponding to the received signal;

change detection means, coupled to said receiving means, for detecting changes in said digital codes and issuing pulses corresponding to said changes;

synchronization means coupled to said change detection means, for producing bit-synchronizing clock pulses from said pulses issued from said change detection means;

counter means, coupled to said synchronization means, for counting a number of said clock pulses and providing an output corresponding to the counted number, said counter means including gate signal generating means for dividing said clock pulses into first and second segments;

comparison means, coupled to said counter means, for comparing the number of clock pulses counted in said first segment with a first threshold value and issuing a command signal when the number of clock pulses counted in said first segment exceeds said first threshold value, and for comparing the number of clock pulses counted in said second segment with a second threshold value when said command signal is issued, said second threshold value being greater than said first threshold value, said comparison means providing an output signal when both thresholds, respectively, are exceeded, indicating receipt of a POCSAG signal;

battery-saving control means, coupled to said comparison means, adapted for initiating a battery-saving function for said battery power source when one of said first and second thresholds, respectively, are not exceeded, and for providing an output control signal when both said first and second thresholds, respectively, are exceeded; and individual address code examining means, coupled to said synchronization means and to said control means, for examining the received signal for frame synchronization and individual address codes when said output control signal is received from said control means.

2. A pager in accordance with claim 1, wherein said comparison means comprises plural comparators having different predetermined threshold values.

3. A pager in accordance with claim 1, wherein said synchronization means comprises:

phase comparator means, coupled to said change detection means and having two inputs and an output, for receiving said pulses output from said change detection means at one of said inputs;

clock generator means for providing reference clock pulses; and digital PLL means, coupled to said phase comparator means and said clock generator means, for integrating the output of said phase comparator means, and for making an addition or reduction to a number of said reference clock pulses provided from said clock generator means, and for providing the added/reduced clock pulses to the other input of said phase comparator means.

4. A pager in accordance with claim 1, wherein said counter means includes an up-down counter receiving an output of said gate signal generating means as an up-down switching signal.

5. A pager in accordance with claim 1, wherein a ratio of dividing said clock pulses into said first and said second segments is substantially 6:10.

6. A pager in accordance with claim 1, wherein said counter means receives an output of said change detection means through a latch, which latch is reset by an output of said gate signal generating means.

7. A method for processing a paging signal received by a pager having a battery power source, comprising the steps of:

receiving a signal from a base station and issuing digital codes corresponding to the received signal;

detecting changes in said digital codes and issuing pulses corresponding to said changes;

producing bit-synchronizing clock pulses from said pulses issued in the change detection step;

counting a number of said clock pulses and providing an output corresponding to the counted number, including the step of dividing the clock pulses into first and second segments;

comparing the number of clock pulses counted in said first segment with a first threshold value and issuing a command signal when the number of clock pulses counted in said first segment exceeds said first threshold value, and comparing the number of clock pulses counted in said second segment with a second threshold value when said command signal is issued, said second threshold value being greater than said first threshold value, and providing an output signal when both thresholds, respectively, are exceeded, indicating receipt of a POCSAG signal;

issuing a battery-saving control signal when one of said first and second thresholds, respectively, are not exceeded, and providing an output control signal when both said first and second thresholds, respectively, are exceeded; and examining the received signal for frame synchronization and individual address codes when said output control signal is received.

* * * * *